(12) United States Patent
Reineck

(10) Patent No.: US 7,581,741 B2
(45) Date of Patent: Sep. 1, 2009

(54) SUSPENSION BRAKE TORQUE REACTOR

(75) Inventor: Benjamin R. Reineck, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 377 days.

(21) Appl. No.: 11/509,477

(22) Filed: Aug. 24, 2006

(65) Prior Publication Data

US 2008/0048408 A1    Feb. 28, 2008

(51) Int. Cl.
*B60G 11/34* (2006.01)
(52) U.S. Cl. .............. 280/124.17; 267/263; 267/48; 267/47; 280/124.175
(58) Field of Classification Search ............. 280/124.17, 280/124.174, 124.175; 267/48, 52, 263, 267/47, 42
See application file for complete search history.

(56) References Cited

U.S. PATENT DOCUMENTS

| 915,227 | A | * | 3/1909 | Scott ......................... 267/43 |
| 1,733,364 | A | * | 10/1929 | Beaumont et al. .............. 267/48 |
| 2,861,798 | A | * | 11/1958 | Lenet et al. .................... 267/45 |
| 3,062,526 | A | * | 11/1962 | Roehrig ........................ 267/48 |
| 3,168,300 | A | * | 2/1965 | Giovinazzo ................... 267/48 |
| 3,578,355 | A | * | 5/1971 | Oeder ................. 280/124.163 |
| 3,785,673 | A | * | 1/1974 | Harbers et al. ........ 280/124.101 |
| 4,919,399 | A | | 4/1990 | Selzer |
| 5,362,095 | A | * | 11/1994 | Eveley .................... 280/86.75 |
| 6,361,026 | B2 | * | 3/2002 | Reast ........................... 267/47 |
| 6,406,007 | B1 | * | 6/2002 | Wilson ...................... 267/36.1 |
| 6,739,608 | B2 | * | 5/2004 | Warinner et al. ...... 280/124.163 |
| 7,052,001 | B2 | * | 5/2006 | Hitt et al. ....................... 267/47 |
| 2007/0145706 | A1 | * | 6/2007 | Penzotti ............... 280/124.174 |

\* cited by examiner

*Primary Examiner*—Paul N Dickson
*Assistant Examiner*—Nicole Verley
(74) *Attorney, Agent, or Firm*—Carlson, Gaskey & Olds, P.C.

(57) ABSTRACT

A suspension assembly includes at least one leaf spring with first and second spring ends that are adapted for mounting to forward and rearward vehicle frame portions, respectively. A center portion of the leaf spring is clamped to an axle beam with a clamp. The suspension assembly includes a brake torque reactor that has one end mounted to the center portion of the leaf spring at the axle beam and an opposite end that cooperates with only one of the first and second spring ends to provide resistance for the leaf spring from deforming due to wind up generated during braking applications.

20 Claims, 2 Drawing Sheets

US 7,581,741 B2

SUSPENSION BRAKE TORQUE REACTOR

TECHNICAL FIELD

The subject invention relates to a vehicle suspension with a brake torque reactor that is resistant to spring deformation due to brake wind up at an associated axle interface.

BACKGROUND OF THE INVENTION

Leaf spring suspensions are commonly used for heavy vehicle applications, and can be used as front or rear suspensions. A leaf spring suspension includes one or more leaf springs overlaid on one another, and having one end mounted to a forward frame portion and an opposite end mounted to a rearward portion. A center portion of the leaf springs is clamped to an axle beam or housing, which defines a lateral axis. One leaf spring suspension is mounted to the axle beam or housing at each lateral side of a vehicle.

This type of suspension is known to provide good ride and handling performance. One disadvantage with this type of suspension is that it is not very resistant to "wind up" during braking applications. During heavy braking applications, the axle beam has a tendency to wind up or wrap around the lateral axis. This wind up causes spring deformation, which is not desirable. Future braking regulations will require even more powerful brakes, which will further exacerbate the wind up problem.

Thus, there is a need for an improved suspension assembly that is resistant to wind up generated by braking forces.

SUMMARY OF THE INVENTION

A suspension assembly includes at least one leaf spring and a brake torque reactor that cooperates with only one end of the leaf spring such that the leaf spring is resistive to deformation due to wind up generated at the axle during braking applications.

The leaf spring has a first spring end that is adapted for mounting to a forward vehicle frame portion, a second spring end that is adapted for mounting to a rearward vehicle frame portion, and a center portion that is clamped to an axle beam with a clamp. The brake torque reactor has a first reactor end mounted to the center portion of the leaf spring and a second reactor end that cooperates with only one of the first and second spring ends to resist spring deformation due to brake wind up, i.e. to resist deformation of wrapping around a lateral axis, defined by the axle beam, during braking applications.

The subject invention allows leaf springs to be optimized for ride and handling with the use of the additional brake torque reactor to resist braking forces. These and other features of the present invention can be best understood from the following specification and drawings, the following of which is a brief description.

DETAILED DESCRIPTION OF THE PREFERRED EMBODIMENT

Figure 1A:
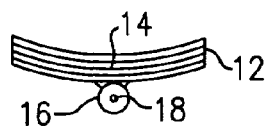
FIG. 1A is a schematic view of a prior art leaf spring and axle assembly in a neutral position.
Figure 1B:
FIG. 1B is schematic view of the prior art leaf spring and axle assembly in a wind up position during braking.

FIG. 1A shows leaf springs 12 from a traditional leaf spring suspension in a neutral position. The leaf springs 12 have a center portion 14 that is mounted to an axle 16 that defines a lateral axis 18. As shown in FIG. 1B, during a heavy braking application, the leaf springs 12 experience spring deformation due to the tendency of the axle 16 to wrap around the lateral axis 18, as indicated by the arrow. This is referred to as "wind up" and disadvantageously exerts stress loads on the axle 16 and associated suspension components, which can lead to premature wear or failure.

In addition, the "wind up" also can create "brake steer," which could occur on a front axle due to the relative motion between steering components/linkages and the leaf springs. This "brake steer" is not desirable, as it would cause the vehicle to "steer" away from a desired path due to heavy braking. Also, the "wind up" is undesirable to drive axles, as it could change an input shaft angle, which may cause issues such as vibration to occur.

The subject invention addresses these problems by providing the leaf spring suspension with a component that resists these braking forces. This additional component does not compromise suspension ride and provides an additional benefit of slightly increasing roll stiffness.

Figure 2A:
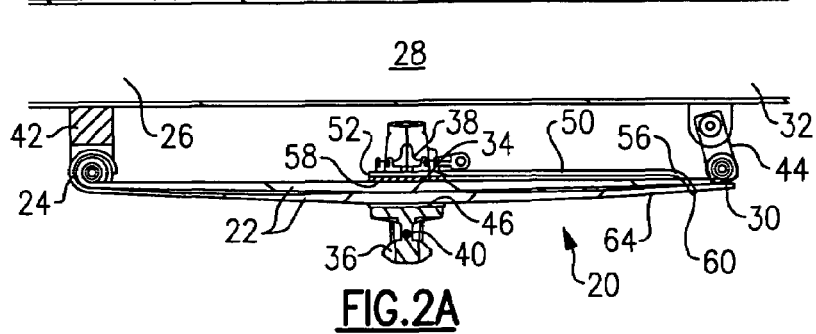
FIG. 2A is one example of a leaf spring suspension incorporating the subject invention.

A leaf spring suspension is shown generally at 20 in FIG. 2A. The leaf spring suspension 20 includes a plurality of leaf springs 22 that are overlaid on one another as known. In the example of FIG. 2A, two leaf springs 22 are shown, however, the leaf spring suspension 20 could include additional leaf springs or could include only one leaf spring depending upon the vehicle application. The leaf springs 22 have a first end 24 that is mounted to a forward portion 26 of a vehicle frame 28 and a second end 30 that is mounted to a rearward portion 32 of the vehicle frame 28. A center portion 34 of the leaf springs 22 are clamped to an axle housing or beam 36 with a clamp joint 38 as known.

The axle beam 36 defines a lateral axis 40 that extends between laterally spaced wheels (not shown) that are supported at each end of the axle beam 36. One leaf spring suspension 20 is mounted adjacent each wheel, at each end of the axle beam. FIG. 2A shows one of these leaf spring suspensions 20, with the understanding that the other leaf spring suspension 20 is similarly configured.

The leaf springs 22 extend in a longitudinal direction that is transverse to the lateral axis 40. A first end 24 of the leaf springs 22 is mounted to the forward portion 26 via a first bracket 42. The second end 30 is mounted to the rearward portion 32 via a second bracket and link assembly 44. The clamp joint 38 clamps the center portion 34 of the leaf springs 22 against an upper surface 46 of the axle beam 36. In the example shown, the clamp joint 38 comprises a U-bolt assembly, however, other types of clamping members could also be used.

The leaf spring suspension 20 includes a brake torque reactor 50 that is used to resist wind up during braking forces. The brake torque reactor 50 extends in the longitudinal direction, transverse to the lateral axis 40. The brake torque reactor 50 has a first reactor end 52 that is clamped to the axle beam 36 with the center portion 34 of the leaf springs 22. A second reactor end 56 cooperates with only one of the first 24 and second 30 ends of the leaf springs 22 to provide resistance for the leaf springs 22 from deforming due to wind up generated during braking applications. Thus, the brake torque reactor 50 provides resistance to prevent the leaf springs 22 from wrapping around the lateral axis 40 with the axle beam 36 during braking applications.

Figure 2B:
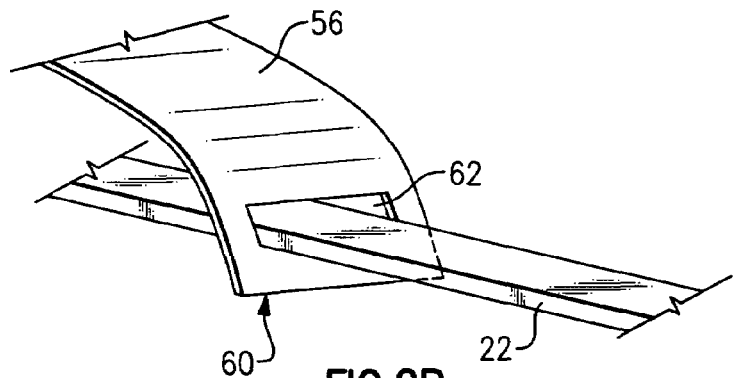
FIG. 2B is a schematic view of an end of a brake torque reactor from the leaf spring suspension of FIG. 2A.

In the example of FIG. 2A, the second reactor end 56 of the brake torque reactor 50 cooperates with the second end 30 of the leaf spring 22. In this configuration, the center portion 34 of the leaf spring 22 is clamped between a lower surface 58 of the brake torque reactor 50 at the first reactor end 52 and the upper surface 46 of the axle beam 36. The second reactor end 56 extends rearwardly over the top of the leaf springs 22 and includes a hook portion 60 that includes an opening 62 (FIG. 2B) that allows the leaf spring 22 to pass through. An end of the brake torque reactor 50 extends beyond a lower surface 64 of the leaf springs 22.

In this configuration, where the vehicle would be traveling to the left in FIG. 2A, as vehicle brakes are heavily applied, the axle beam 36 has a tendency to wrap or wind up in a counter-clockwise direction about the lateral axis 40, similar to that shown in FIG. 1B. The brake torque reactor 50 engages the bottom rear surface 64 of the leaf springs 22 to create additional resistance to these braking forces to keep the axle beam 36 from winding up.

Figure 3:
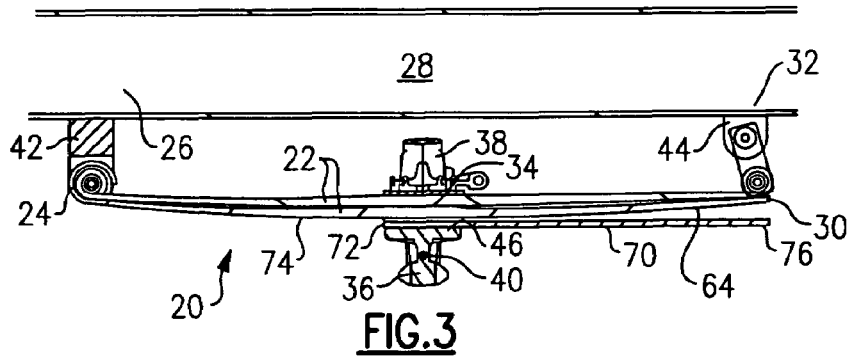
FIG. 3 is another example of a leaf spring suspension incorporating the subject invention.

FIG. 3 shows another example of a brake torque reactor 70 that extends rearwardly from the axle beam 36 and that cooperates with the second end 30 of the leaf spring 22, such as that in FIG. 2A. However, in this configuration, a first reactor end 72 is clamped between a lower surface 74 of the leaf spring 22 at the center portion 34, and the upper surface 46 of the axle beam 36. A second reactor end 76 extends rearwardly underneath the leaf springs 22 and is unsupported at the second reactor end 76.

One advantage with this configuration is that a straight bar can be used for the brake torque reactor 70, instead of a bar with a hook like that of FIG. 2A. In this configuration, where the vehicle would be traveling to the left in FIG. 3, as vehicle brakes are heavily applied, the leaf springs 22 would have a tendency to flex downwardly into contact with the brake torque reactor 70 to engage the bottom rear surface 64 of the leaf springs 22 to create additional resistance in a manner similar to that of FIG. 2A.

Figure 4:
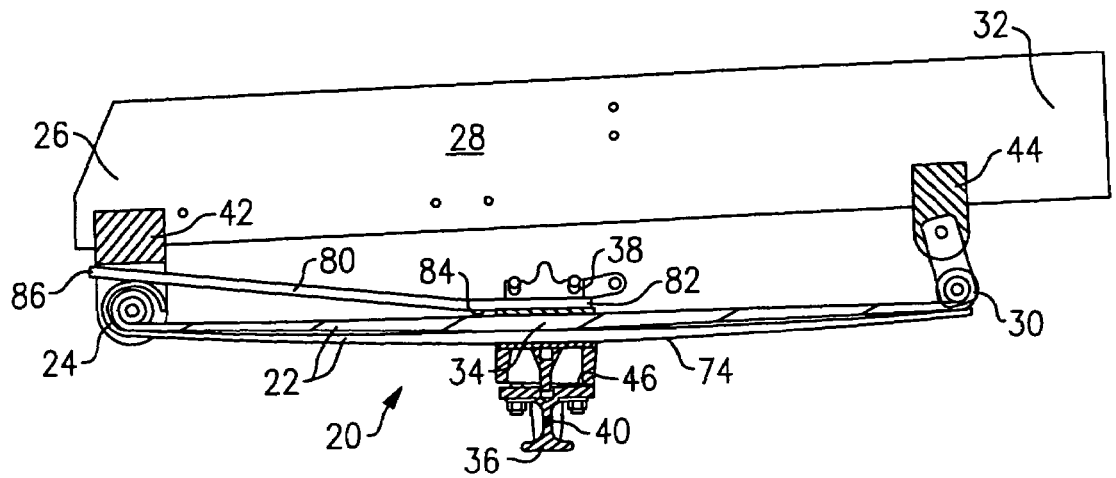
FIG. 4 is another example of a leaf spring suspension incorporating the subject invention.

FIG. 4 shows another example of a brake torque reactor 80. In this example, the brake torque reactor extends forwardly from the axle beam 36 and includes a first reactor end 82 and a second reactor end 86 that cooperates with the first end 24 of the leaf spring 22. In this configuration, the center portion 34 of the leaf spring 22 is clamped between a lower surface 84 of the brake torque reactor 80, at the first reactor end 82, and the upper surface 46 of the axle beam 36. The second reactor end 86 extends forwardly over the top of the leaf springs 22 with the second reactor end 86 resting on top of the leaf springs 22 at the first end 24.

This configuration is similar to those discussed above in that as brake forces cause the axle beam 36 to rotate in a counter-clockwise direction about the lateral axis 40, the brake torque reactor 80 contacts the leaf spring 22 to resist spring deformation due to the brake forces. One advantage of this configuration over previously discussed configurations is that vertical spring rate is not increased, thus ride performance is not adversely affected. As such, immediate contact between the brake torque reactor 80 and leaf spring 22 is obtained without sacrificing any ride performance of the vehicle.

Figure 5:
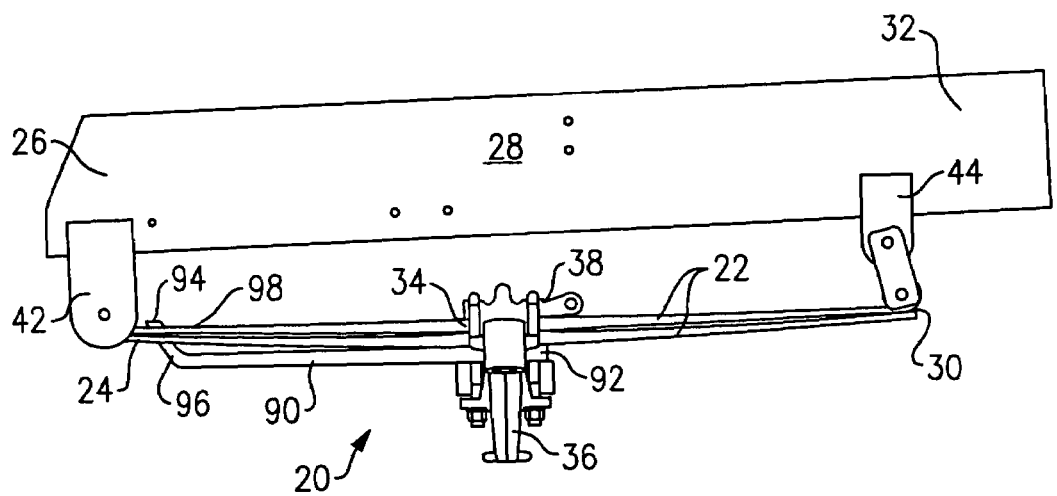
FIG. 5 is another example of a leaf spring suspension incorporating the subject invention.

Another example of a brake torque reactor 90 is shown in FIG. 5. The brake torque reactor 90 extends in a forward direction underneath the leaf springs 22, and has as first reactor end 92 and a second reactor end 96. The first reactor end 92 is clamped between the upper surface 46 of the axle beam and the lower surface of the center portion 34 of the leaf springs 22.

This example is similar to that of FIG. 4 in that the brake torque reactor 90 extends forwardly from the axle beam and has a second reactor end 96 that only cooperates with the first end 24 of the leaf springs 22. This example is also similar to that of FIG. 2A in that the brake torque reactor 90 includes a hook portion 94 that includes an opening 62 (FIG. 2B) that allows the leaf spring 22 to pass through. An end of the brake torque reactor 90 extends beyond a top surface 98 of the leaf springs 22. This configuration has the benefits of the configuration of FIG. 3, i.e., vertical spring rate is not increased.

In each of the configurations discussed above, the brake torque reactor cooperates with only one end of a leaf spring stack to provide resistance to brake wind up. Each brake torque reactor includes a first end that is clamped to the axle beam and a second end that is supported by one end of the leaf spring, but which is not attached to the leaf spring with any type of attachment mechanism. This allows relative movement between the second reactor end and the leaf spring to provide resistance to wind up as described above.

The present invention is advantageous over leaf and a half type suspensions in that the leaf spring springs are optimized for ride and handling, while the brake torque reactor is an additional member that is used to resist braking. Thus, ride and handling performance does not need to be sacrificed for braking performance. In other words, by using the additional brake torque reactor the suspension can be tuned as desired for specific applications with regard to ride, handling, and braking performance.

The present invention is advantageous over auxiliary spring type suspensions in that the brake torque member is included with the leaf spring stack as a module. Thus, no additional frame contact is required, via bumpers or brackets, for example. Further, the present invention can easily be configured such that vertical spring rate is not affected while still providing desired braking resistance.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle suspension assembly comprising:
   at least one leaf spring having a first spring end adapted for mounting to a forward vehicle frame portion, a second spring end adapted for mounting to a rearward vehicle frame portion, and a center portion adapted for mounting to an axle beam; and
   a brake torque reactor having a first reactor end mounted to said center portion of said at least one leaf spring and a second reactor end cooperating with only one of said first and said second spring ends to resist said at least one leaf spring from deforming due to wind up generated during braking applications, and wherein said second reactor end is uncoupled relative to said one of said first and said second spring ends such that said second reactor end is freely movable relative to said one of said first and second spring ends.

2. The vehicle suspension assembly according to claim 1 wherein the axle beam defines a lateral axis extending along a length of the axle beam, and wherein said brake torque reactor provides resistance for said at least one leaf spring from wrapping around the lateral axis with the axle beam during braking applications.

3. The vehicle suspension assembly according to claim 2 wherein said first reactor end is clamped vertically between an upper surface of the axle beam and a lower surface of said at least one leaf spring.

4. The vehicle suspension assembly according to claim 3 wherein said second reactor end cooperates only with said second spring end.

5. The vehicle suspension assembly according to claim 4 wherein said second reactor end is vertically spaced apart from said second spring end in a no load condition with at least one of said second reactor end and said second spring end being movable during braking in a vertical direction relative to the other of said at least one of said second reactor end and said second spring end.

6. The vehicle suspension assembly according to claim 3 wherein said second reactor end cooperates only with said first spring end.

7. The vehicle suspension assembly according to claim 6 wherein said second reactor end includes an opening that receives said at least one leaf spring such that said second reactor end extends beyond an upper surface of said at least one leaf spring.

8. The vehicle suspension assembly according to claim 2 wherein said second reactor end only cooperates with said first spring end, with said second reactor end being supported by said first spring end without any fastening elements.

9. The vehicle suspension assembly according to claim 2 wherein said second reactor end only cooperates with said second spring end, with said second reactor end being supported by said second spring end without any fastening elements.

10. The vehicle suspension assembly according to claim 2 wherein at least one of said at least one leaf spring and said second reactor end is movable relative to the other of said at least one of said at least one leaf spring and said second reactor end during braking.

11. The vehicle suspension assembly according to claim 1 wherein said at least one leaf spring comprises first and second leaf springs each having one first spring end adapted for mounting to a vehicle frame portion, one second spring end adapted for mounting to a rearward vehicle frame portion, and one center portion adapted for mounting to the axle beam, and wherein said brake torque reactor extends over said first and said second leaf springs.

12. The vehicle suspension assembly according to claim 11 wherein said brake torque reactor comprises a straight bar that extends between said first and said second reactor ends, and wherein said straight bar is positioned vertically above said first and said second leaf springs such that said second reactor end rests on said first spring ends without being coupled to either of said first spring ends.

13. The vehicle suspension assembly according to claim 1 wherein said first and second spring ends comprise eye mounts for connection to the forward and rearward vehicle frame portions via brackets, and wherein said second reactor end cooperates only with said first spring end, and wherein said brake torque reactor comprises a straight bar that is generally flat from said first reactor end to said second reactor end, and with a flat second reactor end portion extending over said eye mount at said first spring end.

14. A vehicle suspension assembly comprising:
at least one leaf spring having a first spring end adapted for mounting to a forward vehicle frame portion, a second spring adapted for mounting to a rearward vehicle frame portion, and a center portion adapted for mounting to an axle beam; and
a brake torque reactor having a first reactor end mounted to said center portion of said at least one leaf spring and a second reactor end cooperating with only one of said first and said second spring ends to resist said at least one leaf spring from deforming due to wind up generated during braking applications, wherein the axle beam defines a lateral axis extending along a length of the axle beam, and wherein said brake torque reactor provides resistance for said at least one leaf spring from wrapping around the lateral axis with the axle beam during braking applications, and wherein said center portion of said at least one leaf spring is clamped vertically between an upper surface of the axle beam and a lower surface of said first reactor end of said brake torque reactor.

15. The vehicle suspension assembly according to claim 14 wherein said second reactor end cooperates only with said second spring end.

16. The vehicle suspension assembly according to claim 15 wherein said second reactor end includes an opening that receives said at least one leaf spring such that said second reactor end extends beyond a lower surface of said at least one leaf spring.

17. The vehicle suspension assembly according to claim 14 wherein said second reactor end cooperates only with said first spring end.

18. The vehicle suspension assembly according to claim 17 wherein said second reactor end is solely supported by an upper surface of said first spring end without any attachment mechanism.

19. The vehicle suspension assembly according to claim 14 wherein said second reactor end cooperates only with said first spring end, and wherein said second reactor end is not coupled to said first spring end such that said second reactor end is freely movable relative to said first spring end.

20. The vehicle suspension assembly according to claim 14 wherein said at least one leaf spring comprises first and second leaf springs each having one first spring end adapted for mounting to a vehicle frame portion, one second spring end adapted for mounting to a rearward vehicle frame portion, and one center portion adapted for mounting to the axle beam, and wherein said brake torque reactor is positioned vertically above said first and said second leaf springs with said second reactor end only cooperating with said first spring ends, and wherein said brake torque reactor comprises a straight bar that is generally flat from said first reactor end to said second reactor end, and with said second reactor end resting on said first spring ends without being coupled to either of said first spring ends.

* * * * *

UNITED STATES PATENT AND TRADEMARK OFFICE
CERTIFICATE OF CORRECTION

PATENT NO.       : 7,581,741 B2
APPLICATION NO.  : 11/509477
DATED            : September 1, 2009
INVENTOR(S)      : Reineck Page 1 of 1

It is certified that error appears in the above-identified patent and that said Letters Patent is hereby corrected as shown below:

Claim 14, Column 6, line 8: insert --end-- after "spring"

Signed and Sealed this

Tenth Day of November, 2009

David J. Kappos
*Director of the United States Patent and Trademark Office*